No. 611,507. Patented Sept. 27, 1898.
D. A. QUIGGIN.
FILTER FOR FEED WATER FOR STEAM GENERATORS.
(Application filed Dec. 24, 1897.)
(No Model.) 3 Sheets—Sheet 1.
Fig. I
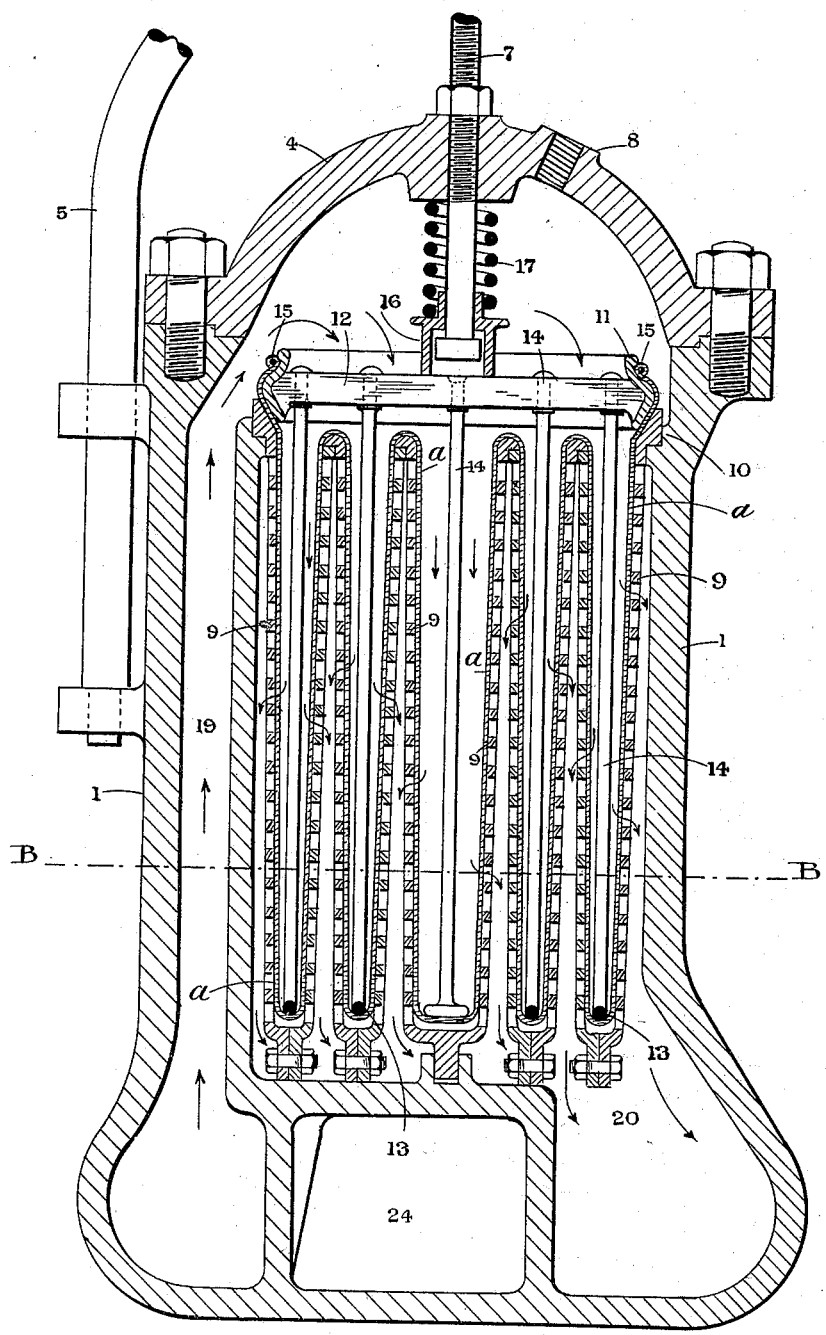
Witnesses.
James M. Spear
F. L. Middleton
Inventor
Daniel A. Quiggin
By Eli Spear
atty.

No. 611,507. Patented Sept. 27, 1898.
D. A. QUIGGIN.
FILTER FOR FEED WATER FOR STEAM GENERATORS.
(Application filed Dec. 24, 1897.)
(No Model.) 3 Sheets—Sheet 2.
Fig. III
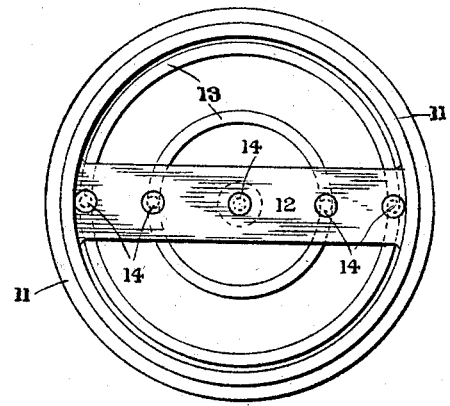
Fig. II
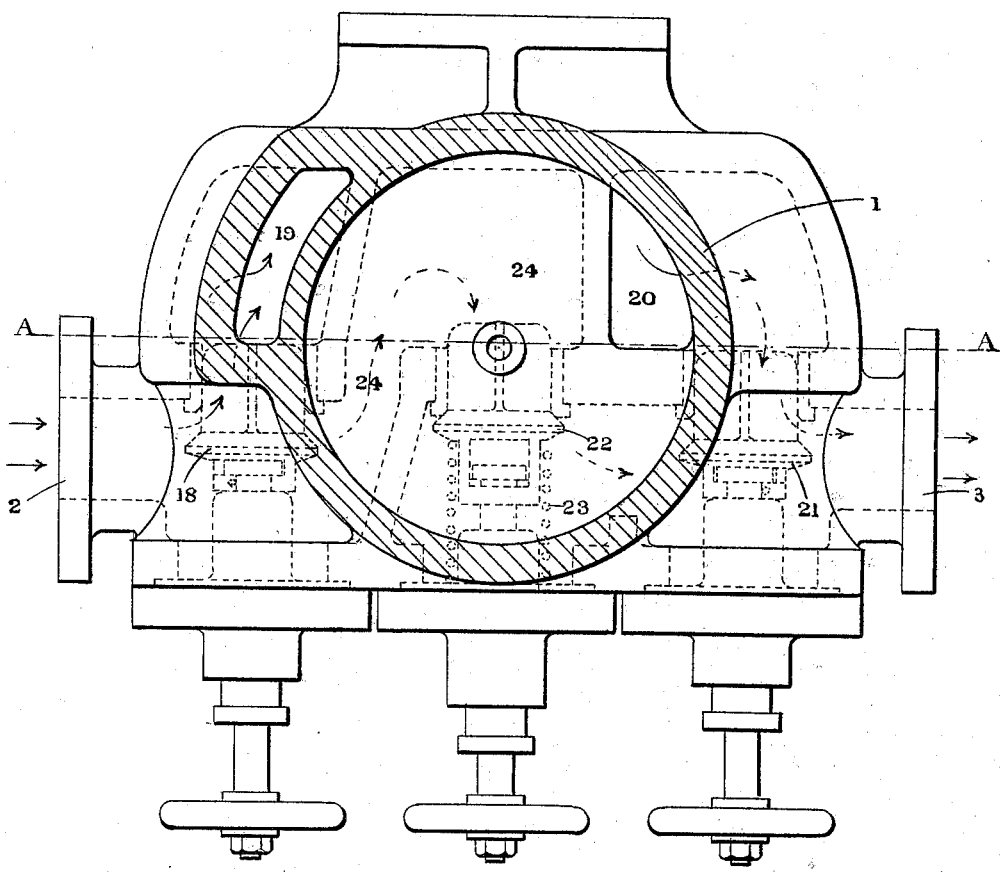
Witnesses
James M. Shear
F. L. Middleton
Inventor
Daniel A. Quiggin
By Ellis Spear
Atty.

No. 611,507. Patented Sept. 27, 1898.
D. A. QUIGGIN.
FILTER FOR FEED WATER FOR STEAM GENERATORS.
(Application filed Dec. 24, 1897.)
(No Model.) 3 Sheets—Sheet 3.
Fig. IV
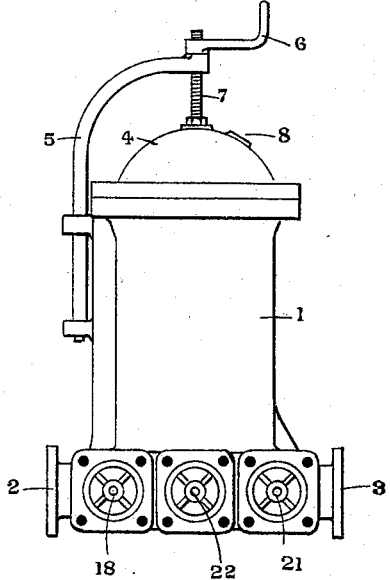
Fig. V
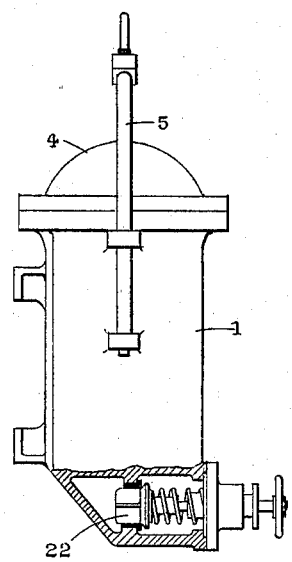
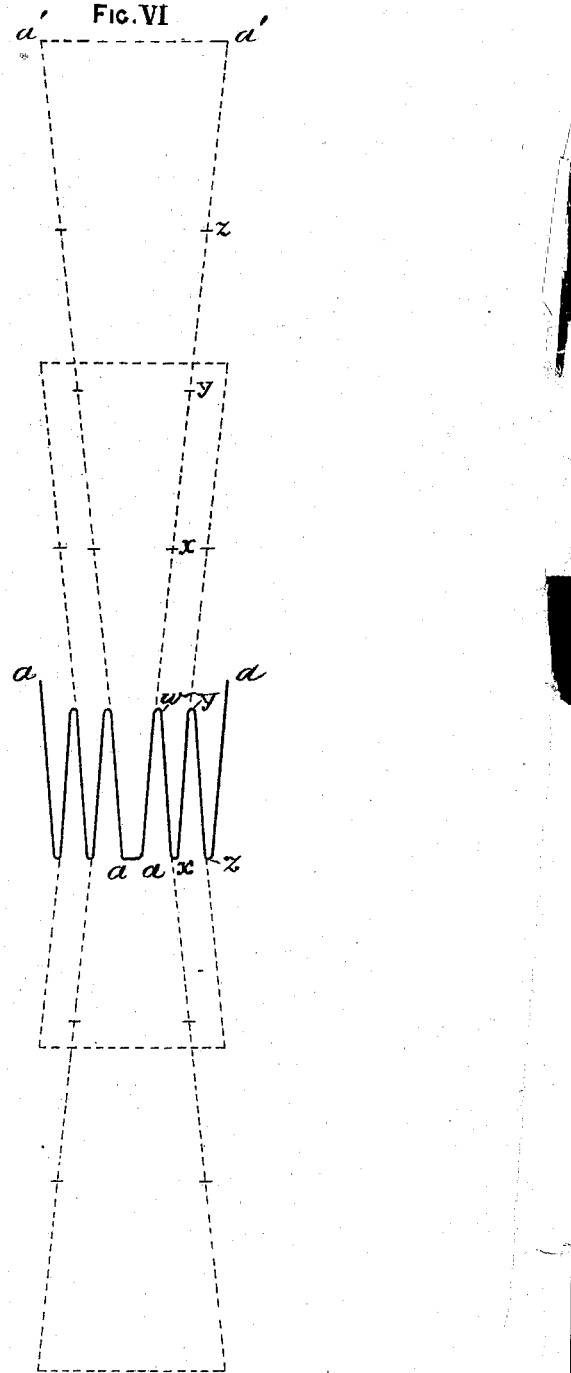
Fig. VI
Witnesses
James M. Spear
F. L. Middleton
Inventor
Daniel A. Quiggin.
By Ellis Spear
Atty.

United States Patent Office.

DANIEL ARTHUR QUIGGIN, OF BLUNDELLSANDS, ENGLAND.

FILTER FOR FEED-WATER FOR STEAM-GENERATORS.

SPECIFICATION forming part of Letters Patent No. 611,507, dated September 27, 1898.

Application filed December 24, 1897. Serial No. 663,354. (No model.) Patented in England March 16, 1896, No. 5,822.

*To all whom it may concern:*

Be it known that I, DANIEL ARTHUR QUIGGIN, a subject of the Queen of Great Britain, residing in Blundellsands, near Liverpool, in the county of Lancaster, England, but at present temporarily residing in Rotterdam, Netherlands, have invented certain new and useful Improvements in Apparatus for Filtering Water, Especially Applicable to Apparatus for Filtering Feed-Water for Steam-Generators, (for which I have obtained Letters Patent in Great Britain, No. 5,822, bearing date March 16, 1896,) of which the followng is a specification.

This invention relates to filters, and is especially applicable to filters for feed-water for steam-generators, the object being to provide a filter having a very large area of filtering material in a comparatively small space and so arranged that the filtering material may be readily removed and replaced.

In the accompanying drawings, which illustrate my invention, Figure I is an elevation in section on the line A A of Fig. II. Fig. II is a plan of the casing in section on the line B B of Fig. I. Fig. III is a plan of the guard for holding the filtering material in place. Figs. IV and V are respectively front elevation and side elevation of the apparatus to a reduced scale, the latter being partially in medial section; and Fig. VI is a diagrammatic view showing the method of folding the filtering material, which is in the form of a conical bag.

Throughout the drawings the same parts are indicated by the same reference letters and figures.

1 is the casing, provided with an inlet branch 2 and an outlet branch 3 and closed above by the removable cover 4. As the filter is by preference interposed between the feed-pump and the boiler, the casing must be sufficiently strong to withstand the full boiler-pressure in addition to the pressure required to drive the water through the filtering material.

By means of the pivoted davit 5, the tapped hand-lever 6, and the screw 7, secured to the cover 4, the latter can be readily lifted clear of the casing and swung to one side, when required, for overhauling.

The casing is fitted with the usual mountings commonly found on filters of this class—such as an escape or safety valve, a pressure-gage, a drain-cock, and an air or grease and blow-off cock, which latter is fitted to the boss 8, Fig. I. These mountings, being of ordinary type, are not shown in the drawings.

The filtering material consists of a conical bag $a\ a$, of flannel, felt, or other suitable material, which is folded as hereinafter described and supported and kept in shape by a series of gratings 9. These gratings are in the form of truncated cones arranged concentrically, with their bases turned alternately in opposite directions, so that their axial section presents the appearance of a series of very elongated V's of as great a depth as the space within the casing will permit. These gratings may be constructed in a variety of ways, either of cast or rolled metal or even stout wire-netting or the like; but they are shown in the drawings as castings fitted together at the top by boring and turning and at the bottom by the flanges and bolts shown, a construction which gives a very substantial and reliable structure. The series of gratings as a whole is seated in the bored recess 10 of the casing. Fig. VI shows the method of folding the bag of filtering material $a\ a\ a\ a$ so that it may conform with the shape of the gratings 9. This is effected by successively turning it inside out at the circles $w$, $x$, $y$, and $z$.

To further assist in keeping the filtering material in position and to facilitate its introduction and removal, I provide a guard. (Shown in Figs. I and III.) This comprises a ring 11, with a cross-bridge 12, carrying the lower rings 13 by the depending stalks 14. The filtering material after being folded is secured at 15 around the ring 11 and in this form can be readily introduced into or removed from the filter. The guard is elastically pressed into place by the piece 16, sliding on a prolongation of the screw 7 and urged downward by the spring 17.

The arrangement of passages and valves for controlling the flow of water and by-passing it when necessary is shown in Fig. II. The water enters at the inlet branch 2, passes the screw-down inlet-valve 18, (which is normally open,) rises through the passage 19, traverses the filtering material, descends through the passage 20, passes the screw-down outlet-valve 21, (which is normally open,) and leaves by the outlet branch 3.

The by-pass valve 22 can either be held shut or open by means of its screwed spindle; but the latter is normally adjusted so as to leave the valve under the control of the spring 23, which is of such a strength that the valve, although normally shut, will open if the resistance of the filtering material should rise abnormally, and the water will then pass directly from the inlet 2 to the outlet 3 through the by-passage 24.

If it be desired to isolate the apparatus, it is only necessary to screw down the valves 18 and 21 and open the valve 22. These valves may also be used for reversing the flow through the filter. For this purpose the valve 18 is shut, 22 is fully opened, and 21 is slightly opened. The blow-off cock is also opened at the same time. Under these circumstances the bulk of the water passes on directly to the boiler through the by-pass valve, but a small proportion enters the filter by the outlet-valve and flows through the filtering material in a reversed direction and so carries off some of the deposited impurities by the blow-off cock. During this reversed flow the displacement of the filtering material is resisted by the rings 13.

Having now fully described my invention, what I claim, and desire to secure by Letters Patent, is—

1. In a filter, in combination; a casing having an inlet and an outlet; a series of concentric reversely-set conical gratings placed in the said casing across the waterway; filtering material of conical configuration adapted to conform with said gratings and to lie across the waterway; and holding means extending down into the annular recesses between the gratings to hold the filtering material down in said recesses, substantially as described.

2. In a filter, in combination; a casing having an inlet and an outlet; filtering material formed in the shape of a conical bag of axial length greater than that of the casing, said bag being reversely folded as at $w$, $x$, $y$, and $z$; and holding means extending down into the recesses or channels between the gratings and adapted to hold the folds of the filtering material therein, substantially as described.

3. In a filter, in combination; a casing with an inlet and an outlet; the series of reversely-set conical gratings formed in sections which fit together at the apices of the cones; the filtering material adapted to conform with said gratings; and means for securing the filtering material in position across the waterway; substantially as described and illustrated.

4. In a filter, in combination; a casing with an inlet and an outlet; the series of concentric reversely-set conical gratings formed in sections which fit together at the top by faced joints at the apices and which are secured together at the bottom by flanges adapted to be bolted together, the structure so formed fitting as a whole in a bored recess in the casing; the filtering material adapted to conform with said gratings; and means for securing the filtering material in position across the waterway; substantially as described and illustrated.

5. In a filter, in combination; the casing having an inlet and an outlet; the reversely-set conical gratings; the filtering material adapted to conform with said gratings; the guard for securing the said material in position which consists of a ring to which the edge of the material is attached, and a series of rings carried therefrom adapted to press the said material into the apices of the gratings; and means for holding the guard in position; substantially as described and illustrated.

6. In a filter, in combination; the casing, the gratings, the filtering material, the guard, and means attached to the cover of the filter and adapted to elastically press the guard into position; substantially as described and illustrated.

7. In a filter, in combination with the casing and the gratings; the filtering material and the guard, the former being formed to fit the gratings and being attached by its periphery to one of the rings of the guard and held in shape by the other rings and being adapted to be inserted into and removed from position with the attached guard; substantially as described and illustrated.

8. In a filter in combination with the casing, the gratings, and the guard; the filtering material consisting of a bag such as $a$, $a$, $a$, $a$, folded as at $w$, $x$, $y$, and $z$ to form a series of reversely-set concentric cones; substantially as described and illustrated.

9. In a filter in combination with the gratings, the filtering material, and the guard; a casing having inlet, outlet, and by-pass valves at one end and a removable cover at the opposite end provided with a spring adapted when the cover is in position to press the guard into position; substantially as described and illustrated.

10. In a filter, in combination with the gratings, the filtering material and the guard; a casing having inlet, outlet and by-pass valves at one end and a cover at the opposite end, said cover being connected by a screw and tapped hand-lever to a pivoted davit, carried from the casing; substantially as described and illustrated.

11. In a filter, in combination; the casing; the gratings; the filtering material; the guard, one of the rings of which is adapted to hold the edge of the said material and form a taper-shoulder which presses the material against a taper-seating on the grating; and means consisting of a presser-piece and spring adapted to elastically press the guard; substantially as described and illustrated.

12. In a filter, in combination; the gratings; the filtering material; the guard; and the casing provided with inlet, outlet and by-pass valves, the latter being provided with a spring which normally tends to close it and a screw-spindle between which and the valve there is a limited relative movement; substantially as described and illustrated.

In testimony whereof I have hereunto set my hand in the presence of two subscribing witnesses.

DANIEL ARTHUR QUIGGIN. [L. S.]

Witnesses:
J. JEANE DE BRUYN, [L. S.]
G. C. GLOOS. [L. S.]